United States Patent [19]

Laundon et al.

[11] Patent Number: 5,039,429
[45] Date of Patent: Aug. 13, 1991

[54] HYPOCHLORITE REMOVAL FROM WASTE STREAM EFFLUENTS

[75] Inventors: Roy D. Laundon, Stockton-on-Tees, United Kingdom; Graham A. Fogg, Calagary, Canada; Murray A. Brennan, Bragg Creek, Canada; Stephen C. Earle, Calgary, Canada

[73] Assignee: Mineral Process Licensing Corp. B.V., Netherlands

[21] Appl. No.: 447,872

[22] Filed: Dec. 8, 1989

[51] Int. Cl.$^5$ .............................................. C02F 1/20
[52] U.S. Cl. ..................................... 210/711; 210/712; 210/717; 210/718; 210/738; 210/750; 210/757; 210/765; 210/778; 423/499
[58] Field of Search ............... 210/749, 756, 757, 762, 210/763, 765, 766, 718, 711, 712, 717, 719, 750, 738, 778; 423/499

[56] References Cited

U.S. PATENT DOCUMENTS

| | | | |
|---|---|---|---|
| 1,153,502 | 9/1915 | Kriegsheim | 423/579 |
| 3,442,802 | 5/1969 | Hamilton et al. | 210/763 |
| 3,965,249 | 6/1976 | Kinosz | 210/763 |
| 4,073,873 | 2/1978 | Caldwell et al. | 423/499 |
| 4,297,333 | 10/1981 | Crawford et al. | 210/763 |
| 4,430,315 | 2/1984 | Caldwell | 423/499 |
| 4,508,697 | 4/1985 | Burrus | 210/757 |
| 4,732,688 | 3/1988 | Bryan et al. | 210/763 |
| 4,764,286 | 8/1988 | Bon et al. | 210/757 |

FOREIGN PATENT DOCUMENTS

| | | | |
|---|---|---|---|
| 3702930 | 8/1988 | Fed. Rep. of Germany | 210/757 |
| 53-113168 | 10/1978 | Japan | 210/763 |
| 798050 | 1/1981 | U.S.S.R. | 210/757 |

Primary Examiner—Peter Hruskoci
Attorney, Agent, or Firm—Barry G. Magidoff

[57] ABSTRACT

This invention relates to the removal of hypochlorite groups from aqueous effluent solutions, so as to permit the disposal of the effluent by deep well injection. More particularly this invention relates to the catalytic decomposition of such hypochlorite groups from scrubbing water effluent used to remove chlorine from a gaseous effluent, wherein a solid catalyst is dissolved, recycled and reprecipitated in situ.

12 Claims, 2 Drawing Sheets

HYPOCHLORITE REMOVAL FROM WASTE STREAM EFFLUENTS

DESCRIPTION OF THE PRIOR ART

It is almost commonplace in the chemical industry to scrub chlorine from effluent gases using alkaline earth or alkali metal hydroxide solutions, so as to remove the toxic chlorine from the effluent gases and thus permit the discharging of the remaining gasesd to the atmosphere. It is also most desirable, of course, to be able to dispose of the alkaline scrubbing liquid effluent in the most efficient and least costly manner, such as by disposal to ground, e.g., deep well injection. However, hypochlorite, which is the usual by-product in such alkaline scrubbing liquids, is present in a concentration too high to permit such ground disposal, as being likely to contaminate ground water.

Among the many procedures for decomposing the hypochlorites in such aqueous alkaline effluent liquids, so as to permit deep well disposal, the most common include the decomposition of the hypochlorites at only slightly elevated temperatures in the presence of a catalyst comprising one or more metals, oxides, or other metal compounds such as the oxides or the salts of nickel, iron, copper, magnesium or cobalt, or combinations of, e.g., iron and nickel oxides. Such metal compounds have been provided as the compound or compounds alone, as in U.S. Pat. No. 3,965,249, to Kinosz, or as supported solid catalysts, supported on, for example, zeolites or organic polymers, as in U.S. Pat. No. 1,153,502, to Kielgsholm, or U.S. Pat. No. Re. 32,392, to Clark et al., or No. 4,400,304, to Clark et al. Although the use of supported catalysts tended to increase the effectiveness and life of the metal catalysts, they are relatively costly, requiring a continuing pruchase of relatively expensive manufactured materials. The use of the unsupported pure catalyst material, in the past, resulted in an undersirably high utilization of the catalyst. Heavy metal catalysts such as nickel or cobalt are themselves considered toxic and may not be discharged freely into the environment.

GENERAL DESCRIPTION OF THIS INVENTION

It is an object of the present invention to provide means for substantially recovering all of the catalytic material used in a hypochlorite decomposition process, and to reduce loss, as by discharge of the catalyst in the effluent waste stream. It is a further objective of this invention to improve the efficiency of the process and reduce the use of costly catalysts. It is yet another important object of the present invention to improve the efficiency of the catalyst and to provide means for the practical retrieval and recycling of the catalyst.

In accordance with the present invention, a solid transition metal catalyst, in the form of the oxide or hydroxide, for example, can be recovered from a treated alkaline aqueous effluent stream by solid-liquid separation means; the separated solid metal catalyst material is then redissolved in an acidic aqueous solution, in the form, e.g., of the metal chloride or nitrate salt, and reprecipitated in situ when recycled to admixture in fresh alkaline, aqueous hypochlorite effluent solution. The continued recycling of the solid particles, without redissolving them, results in growth in the size of the individual crystals and thus a reduction in the total effective catalyst surface area. By dissolving out the catalyst metal values and reprecipitating upon recycling, the desirable total active surface area is maintained for the catalyst, thus maintaining overall catalyst activity during continuous operatin. The metal catalyst material can initially be provided in the form of a soluble salt solution, with additional liquid make-up catalyst solution added as needed.

In this process, the effluent alkaline scrub liquid from the scrubbing of chlorine-containing gaseous effluent is treated. The gas scrubbing usually is carried out in a tower at ambient temperature, utilizing as the scrub liquid an alkaline aqueous solution, e.g., of sodium hydroxide, having a pH of preferably at least about 10. A by-product of this gas scrubbing process is a solution of a metal hypochlorite, usually an alkali or alkaline earth metal, which cannot be readily discharged to the environment without removing, or decomposing the hyipochlorite value.

The decomposition reaction of this process, which is carried out in the presence of a suitable quantity of catalyst, can be summarized as follows:

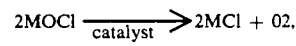

$$2MOCl \xrightarrow{\text{catalyst}} 2MCl + O_2,$$

where M is an alkali metal or an alkaline earth metal, preferably an alkali metal.

The catalyst is a transition metal, preferably in the group from copper to zinc, and most preferably selected from the group consisting of copper, cobalt, nickel, iron and manganese. The catalyst can be initially added to the alkaline scrub effluent as an acidic aqueous solution, which upon admixture with a much greater quantity of the alkaline scrubbing effluent forms an alkaline mixture, from which the metal value precipitates as the oxide or hyodroxide.

The effluent scrub liquid should be itself free from such catalytically active metal values so that the desired catalyst ratio can be maintained; otherwise continued monitoring of the effluent composition would be necessary. To insure that the scrub effluent is substantially free of such catalytically active transition metals, it is usually sufficient to remove all suspended solid particles; at the pH of the effluent scrub liquid, such transition metals are substantially insoluble. Solid material can be removed by settling, or other clarification techniques, and/or flitration.

The hypochlorite decomposition treatment can be carried out batchwise in two or more parallel tanks, or in a continuous flow procedure; in the continuous flow process, contact time for the effluent liquid and catalyst is maintained preferably in a series of cascading holding tanks, all being agitated to maintain concentration uniformity within each tank. Although the decomposition can be carried out at a temperature as high as about 70° C., or even higher up to the boiling point of the scrubbing effluent, it has been found to be most practical to carry out the hypochlorite decomposition reaction in the presence of the catalyst, e.g., Fe (III) - Ni (II) oxides, at a temperature of from about 20° to about 30° C. It is usually sufficient to heat the first tank in the series, as by steam sparging, where the ambient temperature is below the desired level, the exothermic decomposition reaction will maintain the temperature in the subsequent tanks.

The liquid effluent, while mixed with the catalyst, should be maintained at a pH of at least between about 9 and 10, in order to maintain the catalyst insolubility, and to enhance the decomposition reaction. Preferably, the pH is between about 10 and about 12, and can be raised with, e.g., sodium hyodroxide solution, as needed.

DETAILED DESCRIPTION OF A PREFERRED EMBODIMENT OF THE PRESENT INVENTION

Figure 1:
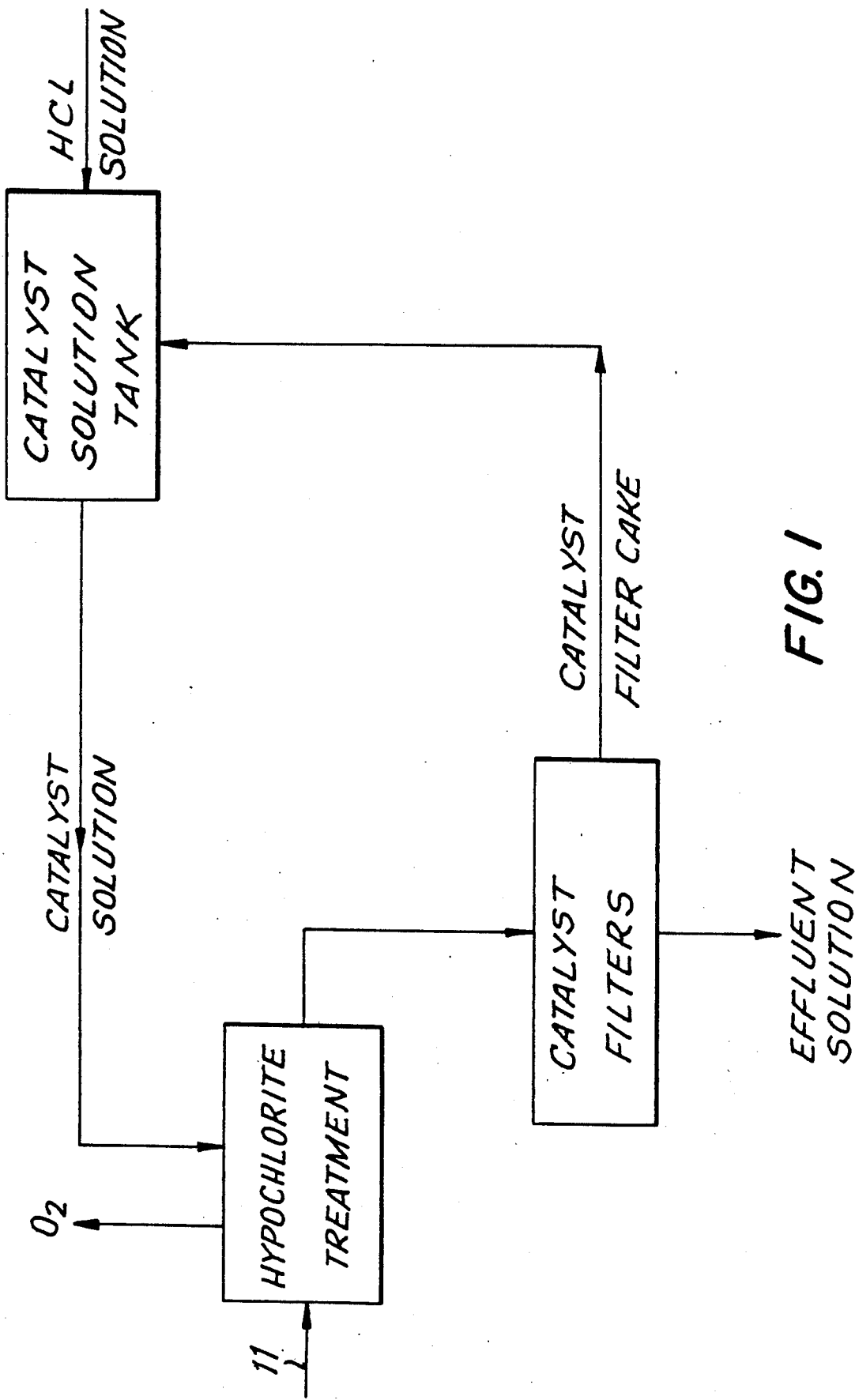
FIG. 1 presents an overall flow sheet for the hypochlorite decomposition of the present invention.
Figure 2:
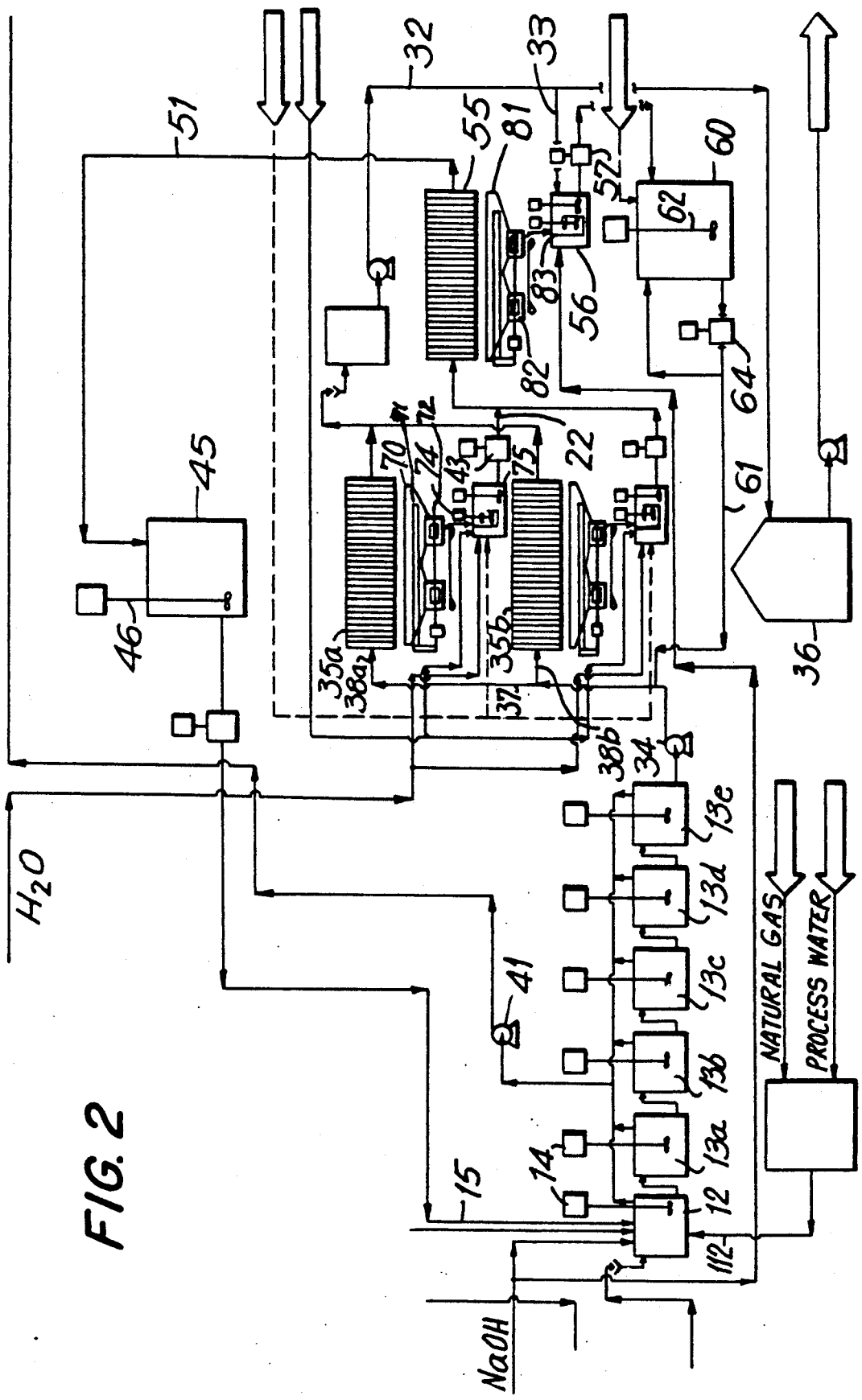
FIG. 2 is a schematic flow diagram for the hypochlorite decomposition portion and the catalyst effluent separation treatment portion of the process.

To provide a clear explanation of the process of the present invention reference is made to the accompanying drawings of FIGS. 1 and 2 and the following verbal description of a preferred embodiment of the process of the present invention.

In the continuous flow process depicted in the drawings, an alkaline scrubbing liquid effluent (which has been initially treated, as by settling and decanting, or filtration, so as to remove any solid materials, and most especially solids which contain iron) is passed through an inlet conduit 11. As the effluent has a pH of at least about 9, there will be substantially no iron value in solution. The clear scrubbing liquid effluent passes through the inlet conduit 11 to a first mixing tank 12, where it is admixed with an acidic catalyst solution, entering through a second conduit 15. The scrubbing liquid effluent contains, e.g. about 4% by wt. hypochlorite.

Preferably, the first mixing tank 12 is steam sparged, through steam line 112, entering the bottom of the tank 12. In this initial stage, the steam heats the liquid, as necessary, preferably to a temperature of about 20° C., or higher, if desired. The exothermic decomposition reaction should maintain the temperature through the system to preferably at least about 20° C. in the last mixing tank 13e. The first mixing tank 12 also preferably is provided with a mechanical agitator 14, as are the subsequent tanks 13a–e.

The catalyst solution is added to the mixture within the tank 12 in an amount, e.g., to provide nickel hydroxide (Ni(OH)2) in an amount of about 0.02 percent by weight and iron hydroxide (Fe(OH)3) in an amount of about 0.01 percent by wt. of the effluent scrub liquid. Oxygen gas is evolved in the first tank 12 but is preferably diluted with an inert gas, or example air, or nitrogen. The mixed liquid passes continuously from the first mixing tank 12 to the succeeding five mixing tanks 13a–e, exiting each tank from the bottom and overflowing into the succeeding tank at the top. The latter five tanks 13a–e are each filled to approximately 80 percent of capacity with liquid, the remaining free space providing for the oxygen gas generated during the hypochlorite decomposition reaction. The first tank 12, in which the largest portion of the decomposition occurs, preferably has approximately 35% free overhead space, for the larger volume of oxygen generated and the attendant frothing of the liquid. Because the majority of the decomposition occurs in the first tank, thereby resulting in the evolution of the greatest amount of oxygen, the initial tank preferably has a slightly greater free volume capacity for the higher volume of gas generated.

For safety reasons, the oxygen should be diluted in the free space within each tank 12, 13 with an inert gas, such as nitrogen, or air. If desired of course, pure nitrogen or other inert gas can be added to the oxygen. However, this is not believed to be necessary to provide the desired dilution effect. The pressure in the free space in each tank 12, 13 is reduced to slightly below ambient by the purge fan 41, which draws out the gas from the tanks 12, 13 thorugh the vent lines 142, venting to the atmosphere; air is thus drawn into the tanks 12, 13 through air vents, as a result of the reduced internal pressure, to dilute the pure oxygen generated.

The acidic catalyst feed solution is introduced into the first tank 12 through a catalyst pipe 15, from the catalyst solution tank 45. The catalyst feed solution entering from pipe 15 contains e.g., nickel and iron in solution as either nickel chloride or nickel sulfate, or iron chloride or iron sulfate. The pH of the catalyst feed solution is preferably from about 4 to 5. As the quantity of the effluent aqueous solution in the initial reaction tank 12 is preferably at least about 30 times greater than the amount of catalyst feed solution added, the resulting catalyst-effluent mixture is highly alkaline, when the two liquors are combined in the tank 12. The pH of the combined liquid in the initial reaction tank 12 is maintained at about 10, causing both the nickel and iron values to substantially immediately precipitate in the form of a mixed nickel-iron hydroxide, forming a slurry in the effluent liquid.

The effluent-catalyst slurry passes serially through the several reaction tanks 12, 13, six in number in this example. The hypochlorite reaction is usually substantially complete prior to the sixth tank, leaving excess capacity in the event of a sudden surge in the hypochlorite level, to form a chloride solution substantially free from hypochlorite, i.e., having a hypochlorite concentration of typically less than about 30 ppm, depending upon the environmental requirements for a particular location; reducing hypochlorite content to below 2 ppm is readily accomplished.

Treated effluent liquor is pumped from the last tank 13e through conduits 37, 38 via effluent pump 34, alternately into two catalyst recovery filter presses 35a,b. By operating the filter presses 35a,b in parallel, and alternately, a continuous flow through the hypochlorite decomposition tanks 12, 13 can be maintained.

To maximize recovery of the catalyst particles, a particulate filter aid can be added from the filter aid feed tank 60, via the filter aid conduit 61, to the liquid flowing through the filter conduits 37 (upstream of the filter presses 35) which assists in the removal of small solid particles by the filter. Commercially available such filter aids include diatomaceous earth.

The major portion of the filtrate from each filter press 35 flows through a recovery conduit 32 to the treated effluent tank 36 for storage and ultimate disposal. As the treated effluent is highly alkaline, it must be neutralized before ground disposal, either by the addition of make-up acid or, preferably when available, by admixture with an acidic effluent stream from the major process, until a disposable effluent having a pH in the neutral range of from about 6 to about 8 results, depending upon the ultimate disposal method to be used. The substantially neutralized treated effluent can then be disposed of, as into a deep pressure well.

The catalyst-containing filter cake removed from one of the filter presses 35 is then initially broken up in the filter cake chute 70, by a commercially available filter cake breaker 71, extruded through a filter cake screen 72, to further reduce particle size, and conveyed into a dispersion agitator mini-tank 73 and then into the suspension agitator catalyst recovery tank 39, where the filter cake particles are treated with an acid. Preferably, aqueous hydrochloric acid is added to the catalyst recovery tank 39 in an amount sufficient to reduce the pH of the filter cake to from about 4 to 5, so as to cause the redissolution of the nickel and iron catalyst values within the catalyst recovery tank 39. The resulting slurry is removed by the filter pump 43 from the catalyst recovery tank 39 through filter recovery line 22 to a secondary filter 55 to remove acid-insoluble materials, especially where a filter aid has been added.

The second filter cake from the secondary filter 55 is broken up through the same three-stage dispersion process, i.e., a filter aid cake breaker 81, a filter aid screen 82, a suspension agitator mini-tank 83, and then reslurried in the filter aid filter tank 56, with the addition of a portion of the treated alkaline effluent filtrate from line 32, via branch pipe 33; the resultant filter aid slurry can then be recycled by a recycle filter pump 57 to the filter aid tank 60, which inlcudes a mechanical agitator 62, or stirrer. The filter aid feed pump 64 moves the filter aid slurry through the filter aid feed line 61 back to the treated effluent line 37.

The filtrate from the second filter 55, containing redissolved catalyst metal values (Fe/Ni), is recycled via the catalyst recycle line 51 back to the catalyst solution tank 45, where it can be mixed with fresh make-up catalyst solution using a mechanical stirrer 46.

In addition to the combination of nickel and iron catalysts this iprocess can also be carried out using other transition metal catalysts having equivalent acid-/alkaline solubility values, such as cobalt, copper, chromium, manganese, titanium, vandaium, cadmium, and zinc, or other such transition metals.

The patentable embodiments of this invention which are claimed are as follows:

1. A process for the decomposition of a hypochlorite group dissolved in an alkaline aqueous effluent, to form gaseous oxygen and a chloride salt, the process comprising:

contacting an aqueous effluent solution containing a dissolved hypochlorite group, and having a pH of at least about 9, with a solid transition metal oxide catalyst to decompose the hypochlorite group and to generate gaseous oxygen and to form an aqueous chloride salt solution; separating the solid catalyst from the aqueous chloride solution; contacting the separated solid catalyst with a sufficient amount of an acidic aqueous solution to form an acidic aqueous catalyst solution of the corresponding transition metal salts and separating the transition metal-containing aqueous solution from any remaining solids; and recycling the aqueous transition metal catalyst solution for admixture with additional alkaline aqueous hypochlorite effluent solution, to reprecipitate the transition metal oxide solid catalyst in situ.

2. The process of claim 1 wherein the catalyst solution is contacted with an alkaline aqueous effluent solution having a pH in the range of from about 10 to about 12.

3. The process of claim 1 wherein the transition metal catalyst is a mixture of iron and nickel oxidic compounds.

4. The process of claim 1 wherein the temperature of the alkaline aqueous effluent solution is maintained in the range of from about 20° C. to about 70° C.

5. The process of claim 1 wherein the pH of the aqueous effluent solution is about 10.

6. The process of claim 1 wherein the aqueous catalyst solution contains dissolved iron and nickel in the form of the respective chloride or sulfate salts.

7. The process of claim 6 wherein the effluent aqueous solution is pre-treated to remove any iron value.

8. The process of claim 1 wherein the effluent solution and catalyst mixture is agitated and cascaded through at least three separate containers in a continuous flow process.

9. The process of claim 8 wherein oxygen gas is generated in each container and inert gas is fed into each container in order to dilute the oxygen gas.

10. The process of claim 1 comprising the addition of a solid filter aid into the suspension of solid catalyst in the aqueous chloride salt solution to aid in the separation by filtration of the catalyst solids from the liquid solution.

11. The process of claim 1 wherein the acidic aqueous solution is a hydrochloric acid solution having a pH of not greater than about 3.

12. The process of claim 1 wherein the transition metal catalyst is selected from the group consisting of the oxides and hydroxides of transition metals in the group selected from iron, nickel, copper, cobalt, chromium, titanium, vanadium, cadmium and zinc.

* * * * *